Sept. 12, 1967  D. D. LOBDELL  3,341,807
TRANSDUCER APPARATUS
Filed Oct. 11, 1965
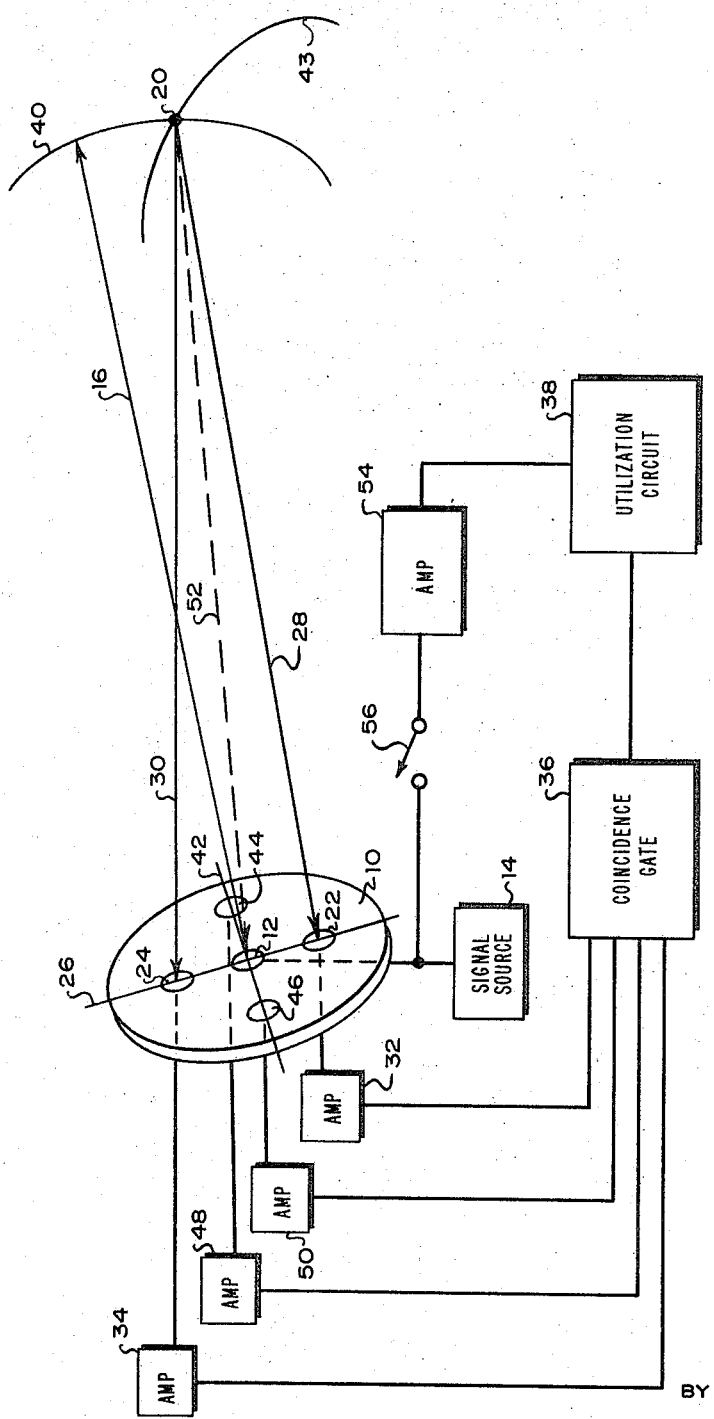
INVENTOR
DONN D. LOBDELL
BY *Q. C. Smith*
ATTORNEY United States Patent Office 3,341,807
Patented Sept. 12, 1967

3,341,807
TRANSDUCER APPARATUS
Donn D. Lobdell, Palo Alto, Calif., assignor to Hewlett-Packard Company, Palo Alto, Calif., a corporation of California
Filed Oct. 11, 1965, Ser. No. 494,798
2 Claims. (Cl. 340—1)

ABSTRACT OF THE DISCLOSURE

A transducer for transmitting an ultrasonic signal toward an echoing body and a coincidence circuit for supplying a driving signal to a utilization circuit only when ultrasonic echo signals are detected within a selected time interval by an array of transducers equidistantly positioned about the transducer-transmitter.

---

This invention relates to ultrasonic transducer apparatus for echo ranging.

Conventional ultrasonic transducers for echo ranging having a fairly good depth resolution; that is, the distance from the transducer to an echoing body can be fairly accurately determined. However, they commonly have poor azimuth resolution. This means that the position of the echoing body along an azimuthal arc intersecting the echoing body and having a radius equal to the distance from the transducer to the echoing body is not well defined.

Accordingly, it is the principal object of this invention to provide ultrasonic transducer apparatus having improved azimuth resolution without significant impairment of its depth resolution.

Another object of this invention is to provide ultrasonic transducer apparatus which is responsive to ultrasonic echo signals for driving a utilization circuit only when the ultrasonic transducer apparatus is substantially directed at the echoing body.

Still another object of this invention is to provide ultrasonic transducer apparatus for driving a utilization circuit only in response to the detection of ultrasonic echo signals within a selected time interval beginning with the detection of the first ultrasonic echo signal.

In accordance with the illustrated embodiment of this invention the ultrasonic transducer apparatus comprises a transducer for transmitting an ultrasonic signal toward an echoing body. A pair of transducers for detecting ultrasonic echo signals from the echoing body is positioned equidistantly from opposite sides of the transducer-transmitter along a line intersecting the transducer-transmitter. Similarly, another pair of transducers for detecting ultrasonic echo signals from the echoing body is positioned equidistantly from opposite sides of the transducer-transmitter along another line intersecting the first-mentioned line at the transducer-transmitter. A coincidence gate connects the transducer-detectors to a utilization circuit and is responsive only to detection of ultrasonic echo signals within a selected time interval by the transducer-detectors to drive a utilization circuit. This time interval begins with the detection of the first ultrasonic echo signal and is selected in accordance with the desired degree of azimuth resolution.

Other and incidental objects of this invention will become apparent from a reading of this specification and an inspection of the accompanying drawing which shows schematically ultrasonic transducer apparatus according to one embodiment of this invention.

Referring now to the drawing the ultrasonic transducer apparatus comprises a support member 10 having an ultrasonic transducer 12 mounted thereon. This transducer 12 is connected to a signal source 14 and is responsive to an electrical signal therefrom for transmitting an ultrasonic signal, represented by the line 16, in the general direction of a body 20 the precise position of which is unknown. Two additional ultrasonic transducers 22 and 24 are mounted on support member 10 equidistantly from opposite sides of the transducer-transmitter 12 along a line 26 intersecting the transducer-transmitter. These transducers 22 and 24 detect ultrasonic echo signals, represented by the lines 28 and 30, from the echoing body 20. Two factors may contribute to the occurrence of the ultrasonic echo signals 28 and 30, which are produced because of the impedance mismatch between body 20 and the surrounding medium. The first factor is that the transducer-transmitter 12 may be larger than the area of desired resolution at which it is directed, and the second factor is the natural spreading of the transmitted ultrasonic signal 16 as it propagates through the surrounding medium. Transducers 22 and 24 must be spaced far enough apart on the support member 10 that the ultrasonic echo signals 28 and 30 will be detected at measurably different times when the support member 10 is oriented so that transducer-detectors 22 and 24 are not substantially equidistant from the echoing body 20. For the orientation of the support member 10 relative to the position of the echoing body 20 shown in the drawing, the ultrasonic echo signal 28 is detected a short time interval before the ultrasonic echo signal 30. Thus, an electrical signal generated by the transducer-detector 22 in response to detection of ultrasonic echo signal 28 is applied to the amplifier 32 a corresponding time interval before a similar electrical signal generated by transducer-detector 24 in response to detection of ultrasonic echo signal 30 is applied to the amplifier 34. These electrical signals are amplified by amplifiers 32 and 34 and are applied to a coincidence gate 36 which is connected to drive a utilization circuit 38 such as a recorder. The coincidence gate 36 is responsive only to the occurrence of these electrical signals, and hence the detection of ultrasonic echo signals 28 and 30, within a selected time interval for supplying a driving signal to the utilization circuit 38. This time interval begins with the detection of the first ultrasonic echo signal 28 and is selected in accordance with the desired degree of azimuth resolution. For example, if the time interval selected is approximately two-hundred nanoseconds (the rise time of a typical accoustical pulse), the azimuth resolution at a distance of thirty centimeters from the support member 10 is one centimeter. This means that no driving signal will be supplied to the utilization circuit 38 unless the support member 10 is oriented so that the difference between the distances from the transducer-detectors 22 and 24 to the position of the echoing body 20 along the azimuthal arc 40 is not greater than $$\sqrt{(S+\tfrac{1}{2})^2+(30)^2}-\sqrt{(S-\tfrac{1}{2})^2+(30)^2}$$

centimeters, where 2S centimeters is the separation between the centers of the transducer-detectors 22 and 24 and thirty centimeters is the distance between the support member 10 and the echoing body 20. When the ultrasonic echo signals 28 and 30 are not detected within the selected time interval, the coincidence gate 36 does not supply a driving signal to the utilization circuit 38. However, when the support member 10 is oriented so that the transducer-detectors 22 and 24 are substantially equidistant from the echoing body 20, the ultrasonic echo signals 28 and 30 are both detected within the selected time interval and coincidence gate 36 supplies a driving signal to the utilization circuit 38.

Other ultrasonic transducers may be mounted on support member 10 to provide still greater azimuth resolution by facilitating location of the echoing body 20 along still other azimuthal arcs intersecting the body 20, such as azimuthal arc 43. For example, as shown in the drawing two more ultrasonic transducers 44 and 46 may be mounted on support member 10 equidistantly from opposite sides of transducer 12 and along the line 42 normally intersecting the line 26 at transducer-transmitter 12. These transducers 44 and 46 are separated by the same distance as transducers 22 and 24. Transducers 44 and 46 detect ultrasonic echo signals from echoing body 20 and apply corresponding electrical signals to amplifiers 48 and 50. These amplifiers 48 and 50 are connected to amplify the electrical signals and apply them to the coincidence gate 36. The coincidence gate 36 is adapted to supply a driving signal to the utilization circuit 38 only when the electrical signals applied thereto from amplifiers 32, 34, 48, and 50 all occur within the selected time interval of the coincidence gate. As explained above, this only occurs when the support member 10 is oriented so that the transducer-detectors 22, 24, 44, and 46 are substantially equidistant from the body 20. Only then will each of the transducers 22, 24, 44, and 46 detect an ultrasonic echo signal from body 20 and generate a corresponding electrical signal within the selected time interval beginning with detection of the first ultrasonic echo signal. It should be apparent that the coincidence gate 36 might just as well be connected directly to the transducer-detectors 22, 24, 44, and 46. When connected in this manner all the amplifiers 32, 34, 48, and 50 but one, which is then connected between the coincidence gate 36 and the utilization circuit 38, may be eliminated from the circuit.

As explained above, the coincidence gate 36 is responsive only to the detection of ultrasonic echo signals within a selected time interval by a selected number of transducer-detectors for supplying a driving signal to the utilization circuit 38. The coincidence gate 36 may be further constructed to be responsive only to ultrasonic echo signals above a selected intensity level. This additional requirement of the coincidence gate 36 would prevent ultrasonic noise signals detected during the selected time interval from causing the coincidence gate 36 to supply a driving signal to the utilization circuit 38 when it would not otherwise do so.

The time interval elapsing between the generation of a transmitted ultrasonic signal by transducer-transmitter 12 and the detection within the selected time interval of corresponding ultrasonic echo signals by transducer-detectors 22, 24, 44, and 46 provides a fairly accurate indication of the distance between the echoing body 20 and the support member 10. This distance might be determined with greater accuracy by using transducer-transmitter 12 to detect an ultrasonic echo signal 52 and apply a corresponding electrical signal to amplifier 54, which is connected to the transducer-transmitter 12 by closing the switch 56. With the switch 56 closed amplifier 54 is connected to amplify this electrical signal and apply it to the utilization circuit 38 where it is related to the time domain to provide an accurate indication of the distance of the echoing body 20 from the transducer-transmitter 12.

I claim:
1. An ultrasonic scanning system for locating the position of an echoing body relative to at least two intersecting axes, said system comprising:
   a first transducer responsive to an electrical signal for transmitting an ultrasonic signal toward the body to produce an ultrasonic echo signal therefrom;
   a source of electrical signal connected to said first transducer for supplying the electrical signal thereto;
   an array of at least four other transducers equidistantly spaced from said first transducer along the intersecting axes for detecting the ultrasonic echo signal from the body, each of said other transducers producing a corresponding electrical echo signal as it detects the ultrasonic echo signal from the body;
   means for supporting all of said transducers in fixed relationship to one another;
   a coincidence gating circuit;
   circuit means connecting each of said other transducers to said coincidence gating circuit for applying the electrical echo signals from said other transducers to said coincidence gating circuit;
   said coincidence gating circuit providing an electrical output signal whenever electrical echo signals are simultaneously applied thereto from each of said other transducers during a selected time interval beginning with and having a duration not longer than the first electrical echo signal in time, electrical echo signals being simultaneously applied to said coincidence circuit from each of said other transducers during said selected time interval only when the ultrasonic echo signal is detected substantially during the selected time interval by each of said other transducers, whereby said electrical output signal substantially indicates the position of the body relative to the intersecting axes;
   a utilization circuit; and
   circuit means connecting said coincidence gating circuit to said utilization circuit for applying the electrcal output signal from said coincidence gating circuit to said utilization circuit.

2. An ultrasonic scanning system as in claim 1:
   wherein at least one of said circuit means comprises amplifying circuitry;
   wherein said first transducer is also operable for detecting the ultrasonic echo signal from the body, said first transducer producing a corresponding electrical echo signal as it detects the ultrasonic echo signal from the body; and
   including means connecting said first transducer to said utilization circuit for applying the electrical echo signal from said first transducer to said utilization circuit.

References Cited

UNITED STATES PATENTS

| 2,416,155 | 2/1947 | Chubb. | |
| 2,808,583 | 10/1957 | Mathes | 343—113 |
| 2,942,258 | 6/1960 | Priest | 343—114.5 X |
| 2,943,322 | 6/1960 | Asbury | 343—118 |
| 2,951,248 | 8/1960 | Goodell | 343—113 |
| 3,149,561 | 9/1964 | Lancaster | 340—1 X |

FOREIGN PATENTS 946,839  1/1964  Great Britain.

RODNEY D. BENNETT, *Primary Examiner.*

RICHARD A. FARLEY, *Examiner.*